(12) United States Patent
Zhang et al.

(10) Patent No.: US 10,766,468 B2
(45) Date of Patent: Sep. 8, 2020

(54) ASCERTAINING AN OFFSET OF AN INERTIAL SENSOR

(71) Applicant: Continental Teves AG & Co. oHG, Frankfurt (DE)

(72) Inventors: Chen Zhang, Frankfurt am Main (DE); Julien Levrier, Ludwigsburg (DE)

(73) Assignee: Continental Teves AG & Co. OHG, Frankfurt (DE)

( * ) Notice: Subject to any disclaimer, the term of this patent is extended or adjusted under 35 U.S.C. 154(b) by 534 days.

(21) Appl. No.: 15/379,640

(22) Filed: Dec. 15, 2016

(65) Prior Publication Data

US 2017/0096127 A1    Apr. 6, 2017

Related U.S. Application Data

(63) Continuation of application No. PCT/EP2015/058580, filed on Apr. 21, 2015.

(30) Foreign Application Priority Data

Apr. 23, 2014    (DE) .......................... 10 2014 207 628

(51) Int. Cl.
    *B60T 8/1755*    (2006.01)
    *B60T 7/04*    (2006.01)

(52) U.S. Cl.
    CPC .......... *B60T 8/17551* (2013.01); *B60T 7/042* (2013.01); *B60T 2250/02* (2013.01); *B60T 2250/03* (2013.01); *B60T 2250/06* (2013.01)

(58) Field of Classification Search
    None
    See application file for complete search history.

(56) References Cited

U.S. PATENT DOCUMENTS

| | | |
|---|---|---|
| 4,651,292 A | 3/1987 | Jeenicke et al. |
| 5,307,274 A | 4/1994 | Takata et al. |

(Continued)

FOREIGN PATENT DOCUMENTS

| | | |
|---|---|---|
| CN | 101119864 A | 2/2008 |
| CN | 101196534 A | 6/2008 |

(Continued)

OTHER PUBLICATIONS

International Search Report and Written Opinion dated Mar. 7, 2015 from corresponding International Patent Application No. PCT/EP2015/058580.

(Continued)

*Primary Examiner* — Nicholas K Wiltey

(57) ABSTRACT

A method of providing an additive offset of a longitudinal acceleration signal of a traveling motor vehicle. The signal being measured by an inertial sensor is ascertained. At least the longitudinal acceleration signal, a braking signal, and a drive signal are detected. A force balance of the longitudinal dynamic of the motor vehicle is analyzed. The signals are detected both during at least one acceleration process as well as during at least one braking process. The signals during the acceleration processes are detected and/or analyzed separately from the signals during the braking processes, and the additive offset is ascertained by comparing the signals detected during the acceleration processes or the values calculated therefrom with the signals detected during the braking processes or the values calculated therefrom. The invention further relates to an electronic controller.

22 Claims, 3 Drawing Sheets

(56) References Cited

U.S. PATENT DOCUMENTS

| | | | |
|---|---|---|---|
| 5,526,263 A | 6/1996 | Tanaka et al. | |
| 5,566,094 A * | 10/1996 | Kojima | B60T 8/172 |
| | | | 701/71 |
| 6,055,841 A * | 5/2000 | Yamada | G01P 21/00 |
| | | | 701/70 |
| 6,498,976 B1 * | 12/2002 | Ehlbeck | B60G 17/0162 |
| | | | 701/70 |
| 8,489,355 B2 | 7/2013 | Kretschmann et al. | |
| 8,880,288 B2 * | 11/2014 | Li | B60T 8/172 |
| | | | 180/199 |
| 10,189,472 B2 * | 1/2019 | Kava | B60W 30/02 |
| 2001/0020208 A1 * | 9/2001 | Holl | G01P 13/00 |
| | | | 701/70 |
| 2005/0090962 A1 * | 4/2005 | Ota | F16H 3/663 |
| | | | 701/51 |
| 2006/0129291 A1 * | 6/2006 | Lu | B60T 8/17554 |
| | | | 701/36 |
| 2007/0078581 A1 * | 4/2007 | Nenninger | B60G 17/0162 |
| | | | 701/70 |
| 2007/0156311 A1 | 7/2007 | Elcock et al. | |
| 2008/0140291 A1 * | 6/2008 | Kobayashi | B60W 40/107 |
| | | | 701/70 |
| 2009/0018739 A1 * | 1/2009 | Ohmori | B60T 7/122 |
| | | | 701/70 |
| 2009/0177346 A1 * | 7/2009 | Hac | B60W 30/045 |
| | | | 701/31.4 |
| 2010/0004860 A1 * | 1/2010 | Chernoguz | G01C 22/006 |
| | | | 701/494 |
| 2010/0063666 A1 * | 3/2010 | Schumann | B60T 8/1708 |
| | | | 701/31.4 |
| 2010/0116235 A1 * | 5/2010 | Imamura | B60W 20/15 |
| | | | 123/179.3 |
| 2010/0256883 A1 * | 10/2010 | Sauter | F16H 61/0213 |
| | | | 701/65 |
| 2012/0095643 A1 | 4/2012 | Bose et al. | |
| 2012/0310473 A1 * | 12/2012 | Yoshii | G01P 21/00 |
| | | | 701/33.1 |
| 2013/0133422 A1 * | 5/2013 | Yamanaka | G01C 19/5747 |
| | | | 73/504.03 |
| 2014/0046532 A1 | 2/2014 | Saito et al. | |
| 2014/0277860 A1 * | 9/2014 | Pulliam | B60L 15/20 |
| | | | 701/19 |
| 2015/0006052 A1 * | 1/2015 | Sannodo | B60W 20/10 |
| | | | 701/70 |
| 2015/0151725 A1 * | 6/2015 | Clarke | B60W 30/00 |
| | | | 701/28 |
| 2015/0217688 A1 | 8/2015 | Schneider et al. | |
| 2016/0200318 A1 * | 7/2016 | Parikh | G01S 13/931 |
| | | | 701/96 |
| 2017/0297563 A1 * | 10/2017 | Kava | B60W 10/06 |
| 2018/0031601 A1 * | 2/2018 | Anac | G01C 19/5726 |

FOREIGN PATENT DOCUMENTS

| | | |
|---|---|---|
| CN | 101196535 A | 6/2008 |
| DE | 3212611 A1 | 10/1983 |
| DE | 19728867 A1 | 1/1999 |
| DE | 10154341 A1 | 5/2003 |
| DE | 102005025851 A1 | 12/2006 |
| DE | 102006012246 A1 | 3/2007 |
| DE | 102008042315 A1 | 4/2010 |
| DE | 102011003298 A1 | 7/2012 |
| DE | 102011089520 A1 | 6/2013 |
| EP | 2535724 A1 | 12/2012 |
| WO | WO2005039955 A2 | 5/2005 |
| WO | WO2005101031 A1 | 10/2005 |

OTHER PUBLICATIONS

German Search Report dated Apr. 2, 2015 for corresponding German Patent Application No. 10 2014 207 628.5.

China Office Action dated Aug. 5, 2018 for corresponding Chinese Patent Application No. 201580021025.2.

* cited by examiner

ASCERTAINING AN OFFSET OF AN INERTIAL SENSOR

CROSS REFERENCE TO RELATED APPLICATIONS

This U.S. patent application claims the benefit of PCT patent application No. PCT/EP2015/058580, filed Apr. 21, 2015, which claims the benefit of German patent application No. 10 2014 207 628, filed Apr. 23, 2014, both of which are hereby incorporated by reference.

TECHNICAL FIELD

The invention concerns a method of ascertaining an offset in an intertial sensor for a vehicle.

BACKGROUND

The driving behavior of motor vehicles, in particular of commercially used vehicles for the transport of loads, can be influenced considerably by the load state. Therefore, various methods for estimating the mass of the vehicle have already become known that only use the signals of the sensors provided for drive dynamics control. If the longitudinal dynamics of the vehicle during an acceleration process are considered, then a balance of forces can be analyzed and the mass of the vehicle can be calculated as the quotient of the difference between the driving and decelerating forces in the denominator and the resulting acceleration in the numerator.

In order to take into account the influence of a gradient during the estimation of the mass of the vehicle, it is known from DE 10 2006 012 246 A1 to measure the longitudinal acceleration with an acceleration sensor. An offset or an additive displacement of the longitudinal acceleration signal can however result in a significant deviation between the actual and estimated masses of the vehicle. Furthermore, an offset of the longitudinal acceleration sensor adversely affects the operation of a hill start aid, because the hill start aid generally adjusts the holding pressure according to the measured gradient or downhill force.

An additive displacement or an offset of the longitudinal acceleration signal can occur for example owing to an inclined installation of the sensor, a temperature change or asymmetrical loading of the vehicle. Whereas an obliquely installed sensor causes a constant or permanent offset, temperature changes or a changed load result in fluctuating or time-varying offsets. In this case the temperature influence can for example be corrected using a characteristic curve if there is a temperature sensor present.

In WO 2005/101031 A1, a method for offset compensation of the electrical signal of a sensor (in particular of an acceleration sensor) is described, with which a compensation value is updated over the long term during the service life of the sensor, wherein the updating is carried out depending on the distance traveled by the vehicle. Based on the assumption that the generation of an average value over a sufficiently large number of measurement values or a sufficiently long stretch of a gradient gives a value of zero, a permanent or slowly varying offset (for example owing to ageing of the sensor) can thus be corrected. The influence of loading changing from journey to journey cannot be taken into account with said method.

From DE 10 2005 025 851 B1, a method for detecting a change of the weight distribution in a vehicle is known, with which after switching off the ignition a first value for the tilt of the vehicle is determined, after switching on the ignition a second value for the tilt of the vehicle is determined, and using a comparison of the first and second values for the tilt of the vehicle a change of the weight distribution in the vehicle can be detected. By means of said method, thus only the offset is determined that is caused by the loading that is carried out during the last period in which the vehicle is at a standstill. It is not ensured thereby that a currently present offset will be adequately compensated.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

The object of the present invention is to specify a method that is based on the sensor system present in a driving dynamics control system for determining an additive displacement of the longitudinal acceleration sensor signal.

An additive displacement of a longitudinal acceleration signal of a traveling motor vehicle measured by an inertial sensor is determined by detecting at least the longitudinal acceleration signal, a brake signal and a drive signal, and by analyzing a balance of forces of the longitudinal dynamics of the motor vehicle, wherein the signals are detected both during at least one acceleration process and also during at least one braking process, wherein the signals for acceleration processes are detected and/or analyzed separately from the signals for braking processes, and wherein the additive displacement is determined from a comparison of the detected signals for acceleration processes or values calculated therefrom with the detected signals for braking processes or values calculated therefrom. The inertial sensor with a displaceably supported test mass can in particular be implemented in the form of a microelectromechanical system.

Thus, no vehicle standstill is necessary in order to determine the additive displacement of the longitudinal acceleration signal. Using the sensor system of a driving dynamics control system that is present anyway, the currently occurring disturbance effects on the longitudinal acceleration signal, such as in particular asymmetrical loading, can be determined and compensated regardless of the gradient angle of the road and regardless of whether the motor vehicle comprises a manual gearbox or an automatic gearbox. In addition, a displacement caused by temperature effects can be taken into account or compensated. For example, the accuracy of a mass estimation can be significantly increased thereby.

An analysis of the balance of forces of the longitudinal dynamics is only carried out if a stable driving state is detected. This prevents an error in a determined displacement from being caused owing to influences that are difficult to account for, such as for example a speed signal adversely affected by engaging the brake slip control.

The stable driving state is detected if a value of an acceleration demand by the driver lies in a predetermined acceleration interval, wherein in particular either a gas pedal operation or a brake operation by the driver exceeds a predetermined threshold value. This ensures that a noticeable driving or braking acceleration of the vehicle is carried out.

The stable driving state is detected if a speed of travel of the traveling motor vehicle lies within a predetermined speed interval. Here the interval can comprise a standstill or a predetermined minimum speed of the vehicle as a lower limit or a lower threshold value, whereas an upper limit advantageously lies between 50 km/h and 100 km/h.

The stable driving state is detected if the magnitude of a steering angle set by the driver lies below a predetermined steering angle threshold value and/or the magnitude of a measured yaw rate lies below a predetermined yaw rate threshold value or the magnitude of a measured lateral acceleration lies below a predetermined turn threshold value. As a result, driving situations are excluded in which significant lateral dynamics or steering displacements by the driver can cause analysis errors.

The stable driving state is detected if a change of the drive signal with time lies below a predetermined drive threshold value or the magnitude of the longitudinal acceleration signal exceeds a predetermined minimum threshold value or neither the drive dynamics control nor the brake slip control is active. This ensures that there is a driving situation that is defined and that can be evaluated well.

The stable driving state may be detected by any of these factors alone or in combination with one another.

The analysis of the balance of forces of the longitudinal dynamics includes a determination of a longitudinal force acting on the vehicle using the drive and/or brake signal, wherein in particular a wind resistance force is also determined and taken into account using a speed of travel of the vehicle.

A first longitudinal acceleration $a_{acc}$ is determined during an acceleration process using the longitudinal acceleration signal and a first longitudinal force $F_{acc}$ is determined at least using the drive signal, and if during a braking process the longitudinal acceleration signal is determined using a second longitudinal acceleration $a_{dec}$ and a second longitudinal force $F_{dec}$ is determined at least using the brake signal, wherein the additive displacement $a_x^{drift}$ of the longitudinal acceleration signal is determined according to $$a_x^{drift} = \frac{a_{acc}F_{dec} - a_{dec}F_{acc}}{F_{dec} - F_{acc}}$$

It can be particularly advantageously provided to detect the sensor signals and/or intermediate variables during a number of braking or acceleration processes and to calculate a respective average value in order to determine the additive displacement using said averaged variables. The additive displacement can thereby be directly calculated.

Furthermore, detection of the sensor signals may be carried out continuously, in particular at fixed time intervals, wherein a first mass is determined using the signals measured during acceleration processes and a second mass is determined using the signals measured during braking processes, and wherein a determination of the additive displacement of the longitudinal acceleration signal is preferably carried out if the difference between the first mass and the second mass exceeds a predetermined tolerance threshold value. The sensor signals are thereby continuously detected and a check is preferably made as to whether a correction is necessary or there is a significant additive displacement using a comparison of the estimated masses during braking or acceleration processes.

Alternatively or in addition to a direct calculation, the determination of the additive displacement can be carried out recursively, wherein a number of first mass values and second mass values are determined and an expected value for the first mass and an expected value for the second mass are calculated, and wherein the difference between the first expected value for the first mass and the expected value for the second mass is minimized, wherein in particular the determined additive displacement is maintained and is not determined again if the difference between the expected values lies below a termination threshold. An optimization method can be used for this that adjusts one or more parameters of a known functional relationship so that a cost function is minimal. For example, a known least-squares method can be used, with which the smallest quadratic deviation or a very small sum of the squares of the deviations between measurement values and adjusted estimated values is the aim. Said stochastic procedure has the advantage that a reliable value for the additive displacement is determined and in addition a quality variable can be specified, such as a variance or a confidence interval. By preferably carrying out the stochastic estimation processes recursively, only a limited amount of memory is required. Robustness against individual outliers, i.e. markedly varying random raw measurement values, can be guaranteed by statistical tests. In particular, a directly calculated additive displacement can be used as a starting value for optimization.

The speed signal is determined using at least one wheel revolution rate sensor and/or the brake signal is determined using a brake pressure sensor and/or a pedal travel sensor on the brake pedal and/or the drive signal is determined from a drive torque signaled by an engine control unit of an internal combustion engine and/or by a motor control unit of an electrical drive and/or a revolution rate measured on a motor shaft.

An electronic control unit, in particular for a brake system of a motor vehicle, has interfaces for the connection of at least one wheel revolution rate sensor, at least one brake operation sensor, at least one inertial sensor disposed in the longitudinal direction and an interface to a vehicle data bus comprising a computing unit that has instructions for ascertaining the offset from the inertial sensor.

The electronic control unit preferably comprises an actuator for the build-up of brake force on one or more vehicle wheels independently of the driver, in particular an electrically operated hydraulic pump and at least one solenoid valve, as well as a computing unit that carries out drive dynamics control, wherein a longitudinal acceleration signal corrected by the additive displacement is fed to the drive dynamics controller. The drive dynamics controller can be a yaw torque controller for maintaining the course predetermined by the driver, a rollover prevention means for preventing tilting about the longitudinal axis of the vehicle, a trailer stabilization means, a braking controller or drive slip controller or a hill start aid.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION OF THE DRAWINGS

Figure 1:
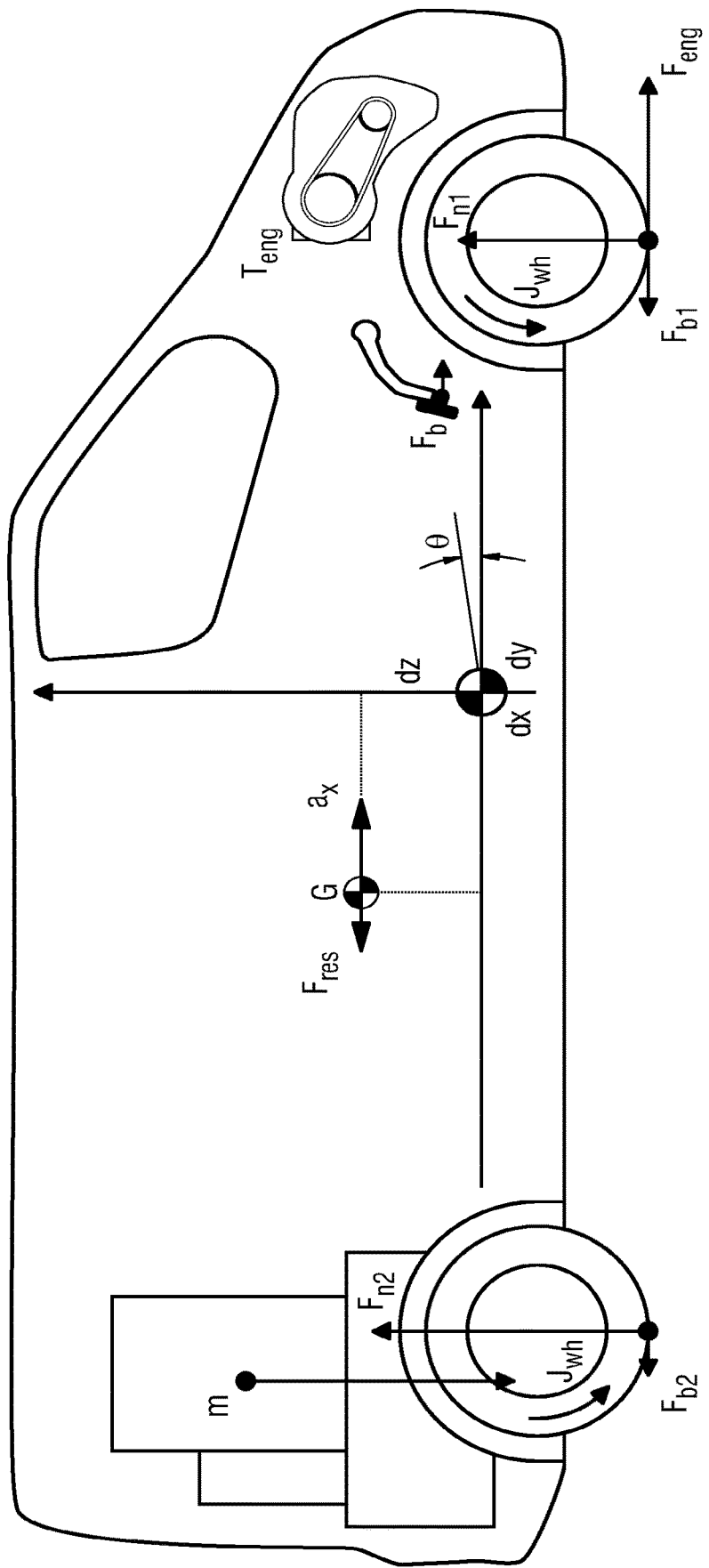
FIG. 1 shows a schematic representation of forces acting on the vehicle.

FIG. 1 shows a side view representation of an exemplary vehicle, wherein the acting forces and the influence of asymmetrical loading are represented schematically.

The engine torque $T_{eng}$ of the drive engine, for example an internal combustion engine, is transferred in said example by means of the wheels of the front axle and causes a driving force $F_{eng}$ on the vehicle. It is indicated by the moments of inertia $J_{wh}$ of the wheels that part of the power applied by the drive engine is also converted into rotational energy of the wheels and drive train. If the acting decelerating forces or drive resistances, such as the rolling resistance and wind resistance, are taken into account then an accelerating force $F_{acc}$ that causes an increase $v_x>0$ of the longitudinal speed $v_x$ of the vehicle can be calculated from the difference of the driving force and the decelerating forces:

$$F_{acc} = m_{Fzg} \cdot \dot{v}_x$$

For this initially traveling on a flat section and a knowledge of the mass of the vehicle $m_{Fzg}$ are assumed for simplicity.

If the driver operates the brake pedal with a certain force $F_b$, then a brake force $F_{brk}=F_{b1}+F_{b2}$ is exerted on the vehicle by the brake system (typically boosted compared to the actuating force) that is distributed according to the installed brake force distribution into the force $F_{b1}$ on the front axle and $F_{b2}$ on the rear axle. Accordingly, taking into account any acting force of the drive engine and the drive resistances additionally decelerating the vehicle, a decelerating force $F_{dec}$ can be calculated that causes a decrease $v_x<0$ in the longitudinal speed $v_x$ of the vehicle:

$$F_{dec} = n_{Fzg} \cdot |\dot{v}_x|$$

In the example shown, a load with the mass m has been stowed in the rear of the vehicle, therefore the contact force $F_{n2}$ of the rear axle has increased more than the contact force $F_{n1}$ on the front axle. The center of gravity G is shifted relative to the unladen vehicle by dx. This results in the longitudinal axis of the vehicle being at an angle θ to the longitudinal axis of the road. As a result, a longitudinal acceleration measured by a fixedly mounted sensor no longer corresponds to the acceleration force, but the sensor signal has an offset or an additive displacement. Furthermore, it is indicated that the center of gravity is shifted upwards by dz relative to the unladen vehicle. Said higher center of gravity results in rolling about the longitudinal axis being able to occur at a lower lateral acceleration compared to the unladen vehicle.

The additive displacement in the measured longitudinal acceleration signal caused by the center of gravity displacement dx can for example cause a negative offset in the case of loading in the front region of the cargo space, which could result in an overestimate of the mass during an acceleration process.

If the load is placed in the rear region of the cargo space, there is a positive offset of the acceleration signal, which could result in an underestimate of the mass during an acceleration process. Besides the influence of non-uniform loading, a large temperature change of the sensor can also cause an offset of the acceleration sensor signal. The measured acceleration value is therefore composed as follows:

$$a_x^{Sensor}(k) = \underbrace{\dot{v}_x(k) + \sin(\gamma(k)) \cdot g}_{a_x^{true}(k)} + a_x^{drift} \qquad (1)$$

wherein $a_x^{Sensor}(k)$ denotes the measured sensor value, $\dot{v}(k)$ denotes the derivative of the longitudinal speed of the vehicle, $\gamma(k)$ denotes the road gradient angle, g denotes the constant acceleration due to gravity, $a_x^{drift}$ denotes the additive displacement or the offset of the acceleration sensor signal and $a_x^{true}(k)$ denotes the offset-free acceleration sensor value.

Time-varying variables or successive measurement values are denoted here by the index k, which thus indicates the respective time.

If the two conditions are met, that 1.) the vehicle is at a standstill $\dot{v}_x=0$ and 2.) that the road has zero gradient (γ=0), the sensor offset value $a_x^{drift}$ could in principle be determined by measuring $a_x^{sensor}$. For checking whether the second condition of a zero gradient road is met, either an independent sensor for measuring a road gradient angle or a check of the following conditions would be necessary, that i.) no brake is operated, ii.) that the vehicle is not being driven and iii.) that the vehicle is not rolling. Because for reasons of cost most vehicles do not comprise an independent gradient angle sensor, and with many vehicles, in particular with vehicles with automatic gearboxes, the conditions i.) and ii.), that no brake is operated and that the vehicle is not being driven, are not met continuously, the determination of the additive displacement is advantageously carried out while traveling.

An electronic control unit for a brake system of the motor vehicle, provides drive dynamics control and/or brake slip control and thereby comprises one or more computing units, in particular a redundant core microcontroller, analyzing circuits for signals of connected sensors as well as one or more interfaces connected to a vehicle data bus such as a CAN bus or a FlexRay bus. In this case, advantageously only signals of sensors already present in the vehicle are detected and/or information such as a drive signal of the engine controller are read out by means of the CAN bus. For example, the revolution rate of the engine can be determined by means of a sensor on the crankshaft connected to the engine controller, and the transmission ratio or the engaged gear can be determined by means of a comparison with the wheel revolution rate.

The electronic control unit is preferably connected to wheel revolution rate sensors on all wheels that are each associated with a wheel and that provide a speed signal. A vehicle speed and a (in particular averaged) wheel acceleration can be determined from the speed signals of the for example 4 wheel revolution rate sensors. A brake operation by the driver in a hydraulic brake system can be detected using the pressure in the master brake cylinder; alternatively or additionally, the signal of a brake pedal angle sensor or of an actuation travel sensor can also be considered. Furthermore, the electronic control unit advantageously comprises a lateral acceleration sensor and/or a yaw rate sensor or is connected to the same. The longitudinal acceleration sensor is implemented as an inertial sensor that comprises a displaceably supported test mass and in particular is implemented as a microelectromechanical system.

In principle, the additive displacement can be determined from the comparison of a braking process with an acceleration process, as is briefly explained below. The following equation for the determined mass $m_{acc}$ during an acceleration process applies following compensation of the additive displacement:

$$m_{acc} = \frac{F_{acc}}{a_{acc} - a_x^{drift}}$$

Accordingly, the following equation for the determined mass $m_{dec}$ during a braking process applies after compensation:

$$m_{dec} = \frac{F_{dec}}{a_{dec} - a_x^{drift}}$$

Because the mass of a vehicle while traveling remains the same (except for the decrease in the tank contents that is neglected here), it must further be true that: $m_{acc}=m_{dec}$.

The offset of the acceleration sensor can thus be calculated according to the following equation:

$$a_x^{drift} = \frac{a_{acc} \cdot F_{dec} - a_{dec} \cdot F_{acc}}{F_{dec} - F_{acc}}. \tag{2}$$

If the calculation of the additive displacement is carried out with consideration of a plurality of braking and drive processes. For an accurate and reliable result, it is necessary for this that there is an equivalent representation of samples from the two groups (acceleration and braking), for example the number of braking processes corresponds to the number of acceleration processes, wherein in the sense of adequate statistical quality, it can be checked for example that the number of braking or acceleration processes considered exceeds a predetermined threshold value. So that a useful additive displacement can be determined, $a_x^{drift}$ may not change during the estimation process, therefore it should in particular be ensured that the load in the cargo space is disposed in such a way and/or an active fixing of the load in the cargo space is carried out so that the load remains in the same position and does not slide back and forth during braking and acceleration processes.

Alternatively or in combination with the calculation according to equation (2), which for a correct result should be based on using a number of raw measurement values of vehicle masses $m_{dec}$ and $m_{acc}$ determined during braking and acceleration processes that are only available after a certain traveling time, a recursive determination or a successive approximation of the additive displacement can also be carried out.

Figure 2:
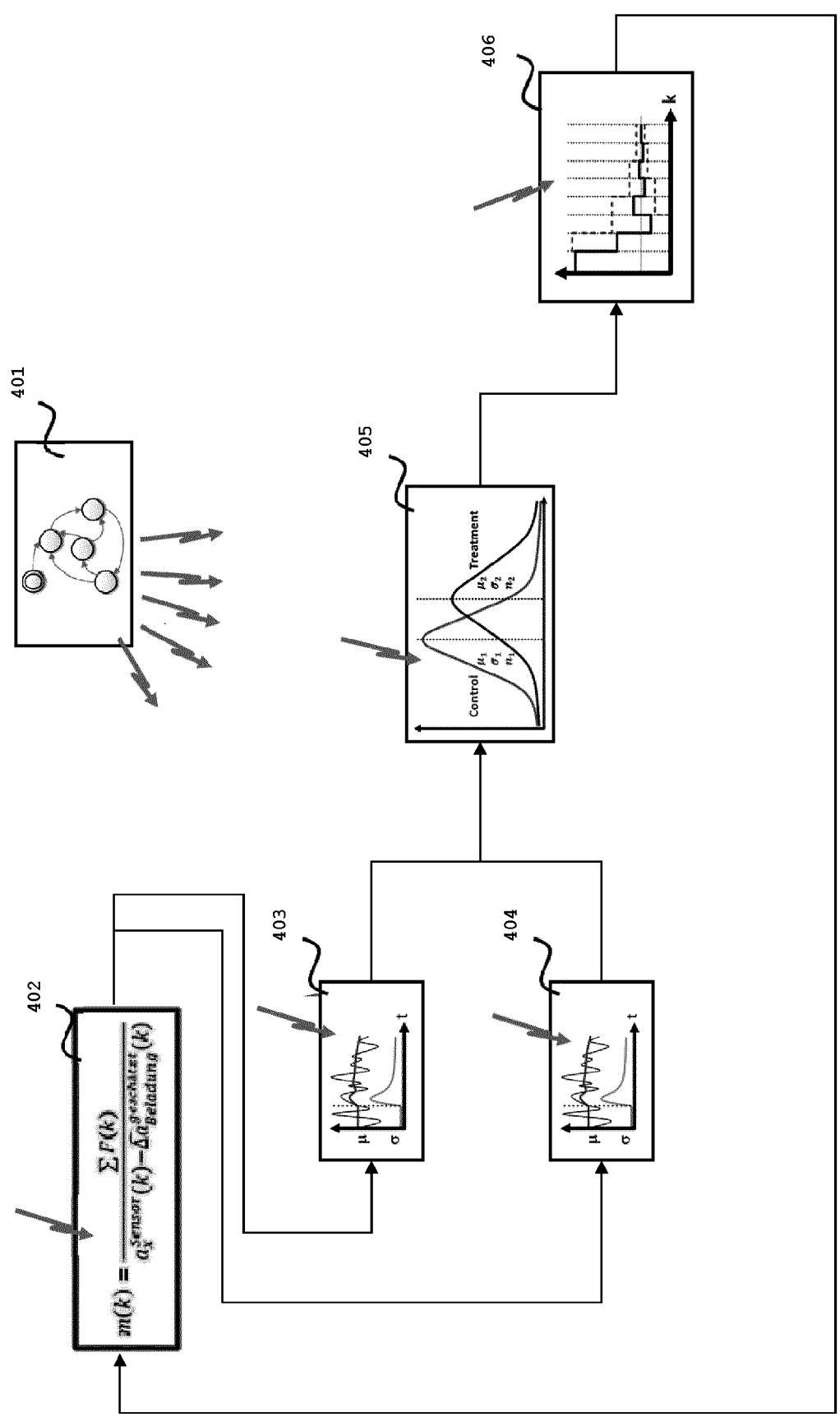
FIG. 2 shows a schematic structure of a recursive estimation method for the determination of a longitudinal acceleration sensor offset.

FIG. 2 shows a schematic structure of a recursive estimation method for the determination of a longitudinal acceleration sensor offset. Individual modules can be interpreted here as individual steps of the method. The signals from sensors present in the vehicle and/or information from electronic control units such as engine torque signals and/or acceleration sensor signals and/or a vehicle speed and/or a pre-pressure or a pressure in the brake master cylinder and/or a pedal travel and/or a yaw rate as well as the measured longitudinal acceleration are fed to the estimation device.

Module 401 is used for learning coordination and is advantageously implemented as a state machine. Said module can predetermine the start and the end of the determination of raw measurement values and the start of a statistical analysis of the raw measurement values and can also carry out re-initialization. For this purpose, it can send signals to the other modules that are indicated in the figure by arrows. Advantageously, said module also comprises an a-priori analysis of the sensor signals, by which a check can be made of whether there is a suitable acceleration or braking process using various criteria.

In particular, no engagement of drive dynamics control or brake slip control should take place, the speed of travel should lie within a predetermined interval of average speeds, the drive torque also should be constant to within a predetermined accuracy even during braking processes, advantageously the transmission ratio of the gearbox (or the engaged gear) should not be too high and should be constant, and travel should be straight-ahead on a road with not too great a gradient. It can be provided that an assessment is additionally or alternatively carried out by means of fuzzy classifiers. On meeting one or more of, preferably all, conditions and if in addition the magnitude of the braking or drive acceleration lies within a predetermined interval, a learning phase is detected or started.

Module 402 is used for raw mass estimation, wherein at each sampling time point at which there are new sensor signals, the balance of forces in the longitudinal direction is analyzed and a raw mass value $\hat{m}(k)$ is calculated according to the following equation:

$$\hat{m}(k) = \frac{\Sigma F(k)}{a_x^{Sensor}(k) - \hat{a}_x^{drift}(k)} \tag{3}$$

Here $\hat{m}(k)$ denotes the calculated raw mass value at a point in time k, $\Sigma F(k)$ denotes the sum of the forces determined in the longitudinal direction at the point in time k, which is calculated inter alia using engine torque and brake pressures, and $\hat{a}_x^{drift}(k)$ denotes the value of the true acceleration sensor offset $a_x^{drift}$ at the point in time k estimated by the method.

Using the insertion of equation (1) in equation (3), $$\hat{m}(k) = \frac{\Sigma F(k)}{a_x^{true}(k) + a_x^{drift} - \hat{a}_x^{drift}(k)}$$

It can be seen that the aim of the estimation is to compensate the effect of the additive displacement $a_x^{drift}$ with a correction constant $\hat{a}_x^{drift}(k)$.

Uncompensated, $a_x^{drift}$ causes a deviation $\Delta m$ from the mass $m(k)$ sought: $\hat{m}(k)=m(k)+\Delta m(\hat{a}_x^{drift}(k))$ The sign of the averaged deviation $B\{\Delta m(\hat{a}_x^{drift}(k))\}$ without compensation, i.e. with $\hat{a}_x^{drift}(k)=0$, is dependent on the driving situation for a constant offset, as can be seen from the following table:

|  | Acceleration: $a_x^{Sensor}(k) > 0$ | Braking: $a_x^{Sensor}(k) < 0$ |
|---|---|---|
| $a_x^{drift} > 0$ (for example rear load) | $E\{\Delta m(\hat{a}_x^{drift}(k))\} > 0$ | $E\{\Delta m\,(\hat{a}_x^{drift}(k))\} < 0$ |

-continued

| | Acceleration:<br>$a_x^{Sensor}(k) > 0$ | Braking:<br>$a_x^{Sensor}(k) < 0$ |
|---|---|---|
| $a_x^{drift} < 0$<br>(for example front load) | $E\{\Delta m(\hat{a}_x^{drift}(k))\} < 0$ | $E\{\Delta m(\hat{a}_x^{drift}(k))\} > 0$ |

If compensation of the additive displacement takes place, then the averaged deviation $E\{\Delta m\}$ in each row of the table tends to zero regardless of the acceleration and braking.

The additive displacement can thus be determined in principle using the following optimization problem:

$$\min_{\hat{a}_x^{drift}} \|E\{\Delta m(\hat{a}_x^{drift})\}\|$$

Because m(k) is unknown, said optimization problem cannot be directly processed. Owing to the ability to calculate m̂(k), the following analogue optimization problem is considered instead:

$$\min_{\hat{a}_x^{drift}} \|E\{\hat{m}|dec, \hat{a}_x^{drift}\} - E\{\hat{m}|acc, \hat{a}_x^{drift}\}\| \quad (4)$$

To solve the optimization problem of (4), the present method divides the offset-affected raw measurement values calculated in module 402 into two groups—a group for raw measurement values m̂/acc from acceleration phases and a group for raw measurement values m̂/dec from braking phases.

In module 403 the statistical properties of the raw measurement values $\hat{m}_{dec}$ determined during braking processes are considered, wherein in particular the weighted average value μ, the weighted variance $\sigma^2$ or the weighted standard deviation σ are output.

Accordingly, in module 404 the statistical properties of the raw measurement values $\hat{m}_{acc}$ determined during the acceleration processes are considered, wherein a (in particular recursive) calculation of the statistical moments such as the weighted average value μ, the weighted variance $\sigma^2$ or the weighted standard deviation σ is carried out.

Using a statistical test, preferably a hypothesis test, on the one hand a check is made in module 405 of whether the representativeness of the random samples is guaranteed, and on the other hand by means of the null hypothesis it is determined whether the expected values of the two groups are identical to a certain significance. If the null hypothesis is discarded at a specified significance level, this means that at the significance level part of the offset $a_x^{drift}$ is still not compensated. Poor candidates for offset values are discarded in this way.

Module 406 carries out an optimization method using the raw measurement values and the statistical test, wherein both grid-based methods and also gradient methods can be used for methodical trial-and-error purposes.

Grid-based methods aim to achieve a global optimum of $\hat{a}_x^{drift}$. For this purpose, possible values of $(\hat{a}_x^{drift})_i$ and $a_x^{drift}$ are distributed at regular intervals. For each of said values, $$\|E_i\{\hat{m}|\text{braked}, (\hat{a}_x^{drift})_i\} - E_i\{\hat{m}|\text{accelerated}, (\hat{a}_x^{drift})_i\}\|$$

is calculated, wherein the value of $\hat{a}_x^{drift}$ that has the deviation with the smallest magnitude is determined.

Gradient methods aim to achieve a global optimum of $\hat{a}_x^{drift}$. In this case an offset estimate $\hat{a}_x^{drift}(k)$ is iteratively determined until the improvement of a step lies below a threshold.

Both grid-based methods and also gradient methods can be configured recursively in order to save hardware resources.

Figure 3:
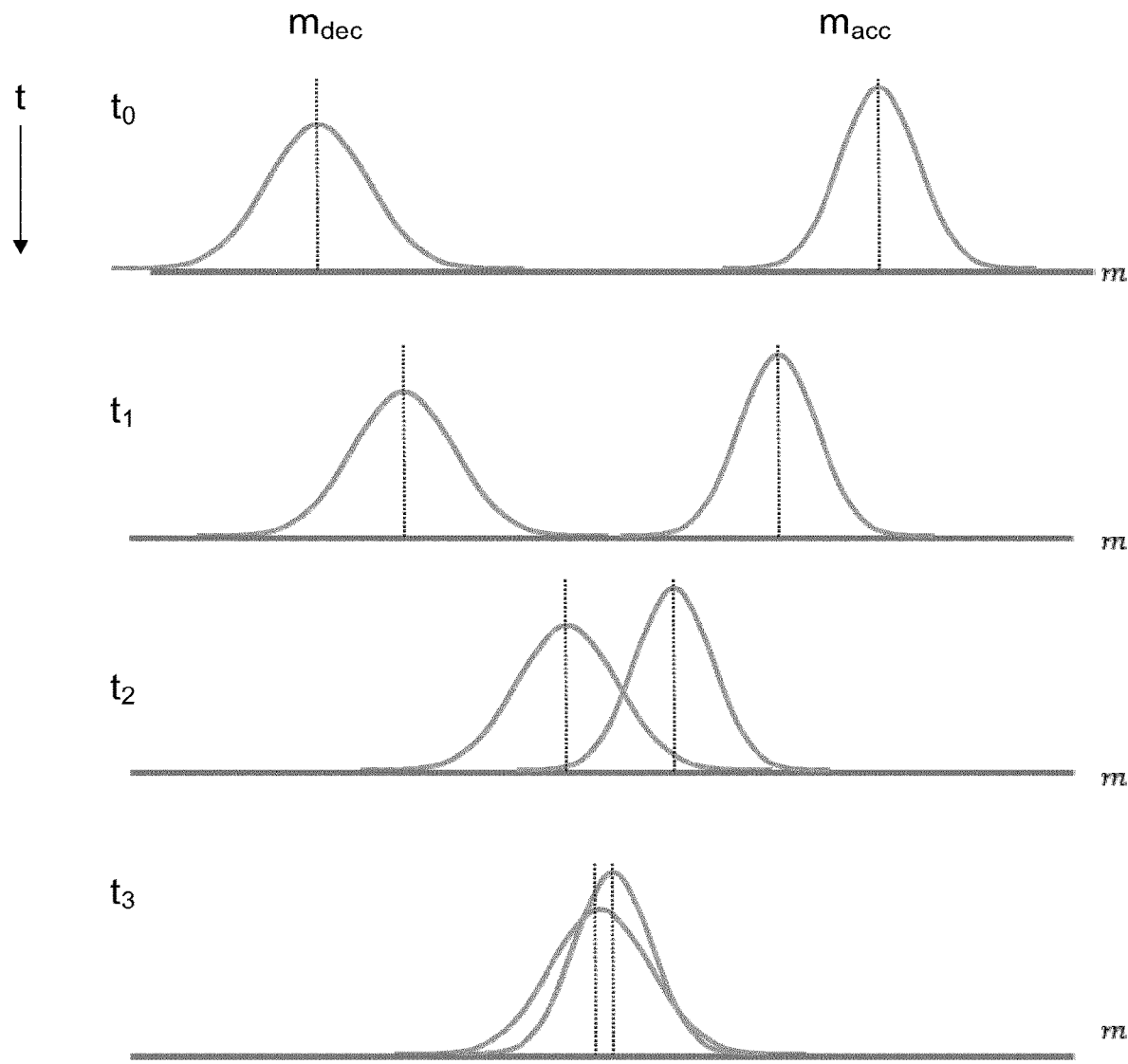
FIG. 3 shows a schematic representation of mass distributions during a successive offset correction of the longitudinal acceleration sensor signal.

FIG. 3 shows a schematic representation of mass distributions during a successive offset correction of the longitudinal acceleration sensor signal. In said example, a load is placed in the rear load space region. Diagrams with estimated vehicle masses at successive points in time t are shown here, wherein $m_{dec}$ denotes a mass estimated during a braking process and $m_{acc}$ a mass estimated during an acceleration process. A finite number of calculations or raw measurement values would only enable a coarse approximation to the continuous mass distributions shown.

From a number of mass value calculations, the mass distributions shown at a point in time $t_0$ would thus be obtained, which yields an average mass or an expected value $E\{m_{dec}\}$ for the estimated mass from a consideration of braking processes and an average mass or an expected value $E\{m_{acc}\}$ for the estimated mass from a consideration of acceleration processes. Because the offset caused by the load and/or a temperature-related offset has/have not yet been determined or compensated, a significant deviation between the expected values or average masses for braking and acceleration processes is apparent.

Based on equation (2) or an optimization method or a consideration of the deviation, an additive displacement can be determined and thus compensated, wherein the expected values or mass distributions show a reduced deviation at a later point in time $t_1 > t_0$.

Accordingly, in a next step a newer or more accurate estimate of the additive displacement is determined, whereupon the expected values or mass distributions show a further reduced deviation at a later point in time $t_2 > t_1$.

Following a further step in the determination of the additive displacement, at a later point in time $t_3 > t_2$ the mass distributions deviate from each other by less than the half-value width thereof (or the variance or a differently predetermined measure of the width of the mass distribution). The additive displacement has been determined sufficiently accurately and can be compensated for the duration of the journey.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

What is claimed is:

1. A method for measuring an additive displacement of a longitudinal acceleration signal of a traveling motor vehicle with an inertial sensor comprising:
   detecting at least the longitudinal acceleration signal, a brake signal and a drive signal;
   analyzing a balance of forces of longitudinal dynamics of the motor vehicle;
   detecting the signals for at least one acceleration process and for at least one braking process, wherein the signals for acceleration processes are detected separately from the signals for braking processes;
   determining the additive displacement from a comparison of
   the signals detected during acceleration processes or values calculated from the signals detected during acceleration process,
   with the signals detected during braking processes or values calculated from the signals detected during braking processes, wherein analysis of the balance of forces of longitudinal dynamics includes a determination of a longitudinal force acting on the vehicle using at least one of the drive and brake signal;

determining a first longitudinal acceleration $a_{acc}$ during an acceleration process using the longitudinal acceleration signal;

determining a first longitudinal force $F_{acc}$ at least using the drive signal;

determining a second longitudinal acceleration $a_{dec}$ during a braking process using the longitudinal acceleration signal;

determining a second longitudinal force $F_{dec}$ at least using the brake signal; and determining an additive displacement $a_x^{drift}$ of the longitudinal acceleration according to:

$$a_x^{drift} = \frac{a_{acc}F_{dec} - a_{dec}F_{acc}}{F_{dec} - F_{acc}}.$$

2. The method of claim 1, wherein analysis of the balance of forces of the longitudinal dynamics is only carried out if a stable driving state.

3. The method of claim 2, wherein the stable driving state is traveling straight ahead.

4. The method of claim 2, wherein the stable driving state is detected if at least one of the following conditions are met:
a magnitude of an acceleration demand by a driver lies within a predetermined acceleration interval;
a gas pedal operation by the driver exceeds a predetermined threshold value;
a brake pedal operation by the driver exceeds a predetermined threshold value;
a speed of travel of the traveling motor vehicle lies within a predetermined speed interval;
a magnitude of a steering angle set by the driver;
a measured yaw rate below a predetermined steering angle threshold value;
a predetermined yaw rate threshold value;
a magnitude of a change with time of the drive signal lies below a predetermined fluctuation threshold value;
a magnitude of a change with time of the brake signal lies below a predetermined fluctuation threshold value;
the magnitude of the longitudinal acceleration signal exceeds a predetermined minimum threshold value;
magnitude of a measured lateral acceleration lies below a predetermined turn threshold value; and
none of drive dynamics control, brake slip control nor drive slip control is active.

5. The method of claim 1, wherein a wind resistance force is determined and taken into account using a speed of travel of the vehicle.

6. The method of claim 1, wherein detecting of the sensor signals is carried out continuously at fixed time intervals.

7. The method of claim 6, further comprising
determining a first mass using the signals measured during acceleration processes;
determining a second mass using the signals measured during braking processes; and
wherein determining the additive displacement of the longitudinal acceleration signal is carried out if a difference between the first mass and the second mass exceeds a predetermined tolerance threshold value.

8. The method of claim 7, wherein determining the additive displacement is carried out recursively further comprising:
determining a plurality of the first mass values and the second mass values;
calculating an expected value for the first mass and an expected value for the second mass;
minimizing a difference between the first expected value for the first mass and the expected value for the second mass; and
maintaining the determined additive displacement when a difference between the expected values lies below a termination threshold.

9. The method of claim 8, wherein the additive displacement is predetermined when the expected value at least one of meets and exceeds the termination threshold.

10. The method of claim 1, further comprising determining a speed signal using at least one wheel revolution rate sensor.

11. The method of claim 1, further comprising determining the brake signal is determined using one of a brake pressure sensor and a pedal travel sensor on a brake pedal.

12. The method of claim 1, further comprising determining the drive signal from at least one of: a drive torque signaled by an engine control unit of an internal combustion engine, by a motor control unit of an electrical drive, and a revolution rate measured on a motor shaft.

13. An electronic control unit for a brake system of a motor vehicle, comprising:
interfaces for connection of at least one wheel revolution rate sensor and at least one brake operation sensor;
at least one inertial sensor disposed in a longitudinal direction and an interface to a vehicle data bus; and
a computing unit with instructions for:
detecting at least a longitudinal acceleration signal, a brake signal and a drive signal;
analyzing a balance of forces of longitudinal dynamics of the motor vehicle;
detecting the signals for at least one acceleration process and for at least one braking process, wherein the signals for acceleration processes are detected separately from the signals for braking processes;
determining an additive displacement from a comparison of the signals detected during acceleration processes or values calculated from the signals detected during acceleration process with the signals detected during braking processes or values calculated from the signals detected during braking processes, wherein analysis of the balance of forces of the longitudinal dynamics is only carried out if a stable driving state, wherein the stable driving state is traveling straight ahead;
determining a first longitudinal acceleration $a_{acc}$ during an acceleration process using the longitudinal acceleration signal,
determining a first longitudinal force $F_{acc}$ at least using the drive signal;
determining a second longitudinal acceleration $a_{dec}$ during a braking process using the longitudinal acceleration signal;
determining a second longitudinal force $F_{dec}$ at least using the brake signal; and
determining additive displacement $a_x^{drift}$ of the longitudinal acceleration according to:

$$a_x^{drift} = \frac{a_{acc}F_{dec} - a_{dec}F_{acc}}{F_{dec} - F_{acc}}.$$

14. The electronic control unit of claim 13, the stable driving state is detected if at least one of the following conditions are met:
- a magnitude of an acceleration demand by a driver lies within a predetermined acceleration interval;
- a gas pedal operation by the driver exceeds a predetermined threshold value;
- a brake pedal operation by the driver exceeds a predetermined threshold value;
- a speed of travel of the traveling motor vehicle lies within a predetermined speed interval;
- a magnitude of a steering angle set by the driver;
- a measured yaw rate below a predetermined steering angle threshold value;
- a predetermined yaw rate threshold value;
- a magnitude of a change with time of the drive signal lies below a predetermined fluctuation threshold value;
- a magnitude of a change with time of the brake signal lies below a predetermined fluctuation threshold value;
- a magnitude of the longitudinal acceleration signal exceeds a predetermined minimum threshold value;
- magnitude of a measured lateral acceleration lies below a predetermined turn threshold value; and
- none of drive dynamics control, brake slip control nor drive slip control is active.

15. The electronic control unit of claim 13, wherein an analysis of the balance of forces of the longitudinal dynamics includes a determination of a longitudinal force acting on the vehicle using at least one of the drive and brake signal.

16. The electronic control unit of claim 13, wherein a wind resistance force is determined and taken into account using a speed of travel of the vehicle.

17. The electronic control unit of claim 13, wherein detection of the sensor signals is carried out continuously at fixed time intervals.

18. The electronic control unit of claim 17 comprising further instructions for:
- determining a first mass using the signals measured during acceleration processes
- determining a second mass using the signals measured during braking processes, and
- wherein determining additive displacement of the longitudinal acceleration signal is carried out if a difference between the first mass and the second mass exceeds a predetermined tolerance threshold value.

19. The electronic control unit of claim 18 wherein determining the additive displacement is carried out recursively, and electronic control unit comprises further instructions for:
- determining a plurality of the first mass values and the second mass values;
- calculating an expected value for the first mass and an expected value for the second mass;
- minimizing the difference between the first expected value for the first mass and the expected value for the second mass; and
- maintaining the determined additive displacement when the difference between the expected values lies below a termination threshold.

20. The electronic control unit of claim 19, wherein the additive displacement is predetermined when the expected value at least one of meets and exceeds the termination threshold.

21. The electronic control unit of claim 13, further comprising determining the drive signal from at least one of: a drive torque signaled by an engine control unit of an internal combustion engine, by a motor control unit of an electrical drive, and a revolution rate measured on a motor shaft.

22. The electronic control unit of claim 13, further comprising
- an actuator for building up a brake force on one or more vehicle wheels independently of a driver, wherein the actuator is an electrically operated hydraulic pump and at least one solenoid valve; and
- a computing unit that implements drive dynamics control, wherein a longitudinal acceleration signal corrected by the determined additive displacement is fed into the drive dynamics control.

* * * * *